Oct. 9, 1973  M. F. MARTIN  3,764,446
DISCARDED TIRE CARCASSES SECURED TOGETHER BY FASTENERS
TO FORM A CHAIN OR MAT
Filed Jan. 19, 1972
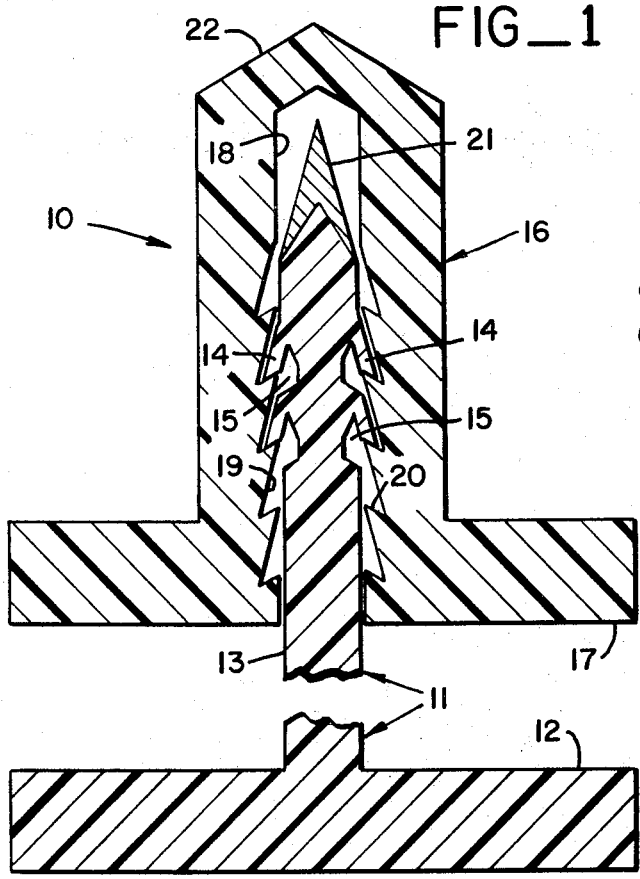
FIG_1
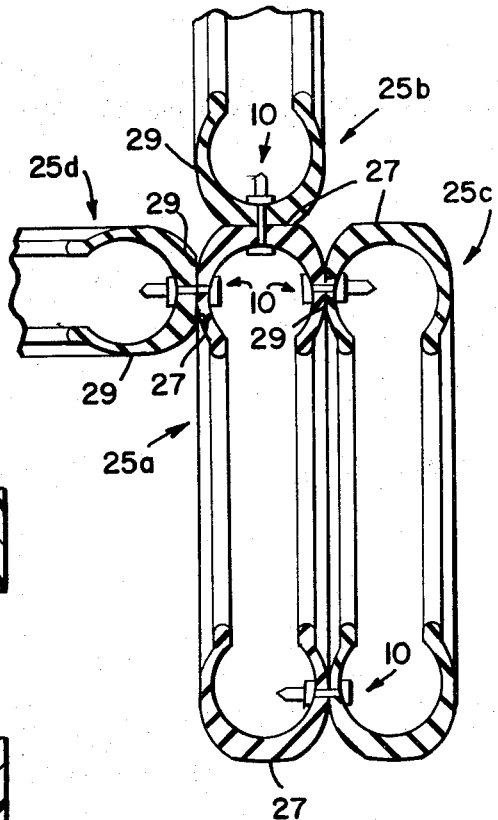
FIG_2
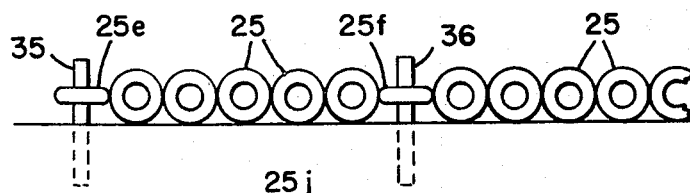
FIG_3
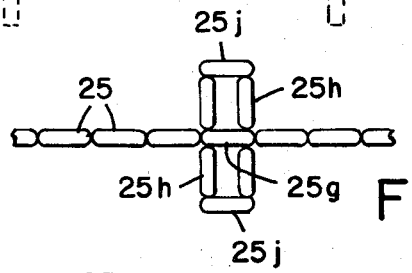
FIG_4
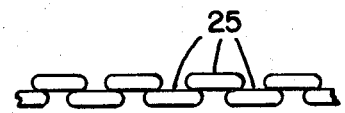
FIG_5
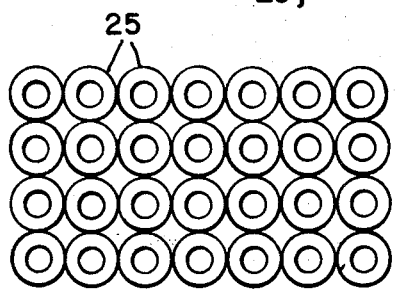
FIG_6
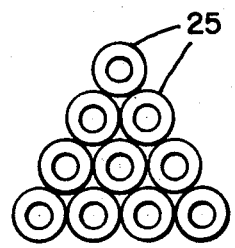
FIG_7A
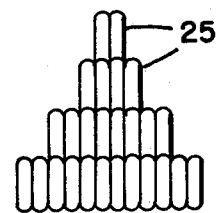
FIG_7B United States Patent Office 3,764,446
Patented Oct. 9, 1973

3,764,446
DISCARDED TIRE CARCASSES SECURED
TOGETHER BY FASTENERS TO FORM
A CHAIN OR MAT
Macklin F. Martin, 6015 Herzog St.,
Oakland, Calif. 94608
Filed Jan. 19, 1972, Ser. No. 218,936
Int. Cl. B32b 3/06, 7/08; B61f 19/04
U.S. Cl. 161—36                                    10 Claims

ABSTRACT OF THE DISCLOSURE

Discarded tire carcasses are utilized by forming them into chains, mats or structures built up by arranging the tires in contact with one another, crown to crown, side wall to side wall, or side wall to crown, and securing the carcasses together by fasteners which pierce the engaging carcass surfaces and engage the insides of the carcasses.

BACKGROUND OF THE INVENTION

At the present time vast quantities of automobile and truck tires are worn out and discarded each year. A recent report of the Rubber Sub-Council of the National Industrial Pollution Control Council states that one of the most pressing problems confronting the industry is that of disposing of the 200 million tires worn out annually by U.S. motorists. Of these, only 10 percent are now processed into reclaimed rubber. The remaining 90 percent must be disposed of in other ways. Many are buried. Some are compressed and baled and dumped in the ocean. Others are taken to public dumps, where they are generally not welcome. Many are discarded by people in empty lots, along roads, in creeks, or any other place they can find.

The Rubber Sub-Council also states that studies show that scrap tires can be recycled into various commercial uses, though probably at an economic penalty. Even so, a minimum outlay of $420 million would be required for plants and equipment and still at least 20 percent—40 million tires a year—would have to be disposed of by conventional ways.

Even though these millions of tires discarded each year are no longer usable for their original purpose, they do possess many potentially desirable features. They are strong, they have bulk, they are resilient, they deteriorate very slowly in water, fresh or salt. At present, these features merely increase the problem of getting rid of the tires.

It is the principal object of this invention to make use of these features by building discarded tire carcasses into usable structures. Although tire carcasses may lack some of the aesthetic appeal of more commonly used building material, there are many areas both in this country and abroad wherein projects are not undertaken for the primary reason that funds for conventional structures and materials are simply not available. Tire carcasses are readily available, and in many instances the user will be paid to take them.

Some limited use of tire carcasses is presently made, one of the main uses being at seaports or the like wherein tire carcasses are used for boat fenders and as cushions for pilings.

Applicant believes that one of the main reasons why tire carcasses have not come into more use for structural purposes is that no one has devised a simple and inexpensive way of assembling and securing together tire carcasses.

SUMMARY OF THE INVENTION

Tire carcasses are built into structural shapes by arranging the carcasses, one by one, into the desired structure with the side wall or crown of one carcass touching the side wall or crown of an adjacent tire. A sharpened fastener is driven from the inside of one of the carcasses through both touching carcasses and the fastener is then secured inside the second carcass to hold the two carcasses securely together, with nothing projecting from the outer surface of the carcasses.

Carcasses may be built up quickly and easily into chains, fences, mats and structures in a manner and for the purposes set forth in more detail hereinafter.

BRIEF DESCRIPTION OF THE DRAWINGS

In the drawings, which form a part of this application, and in which like parts are designated by like reference numerals throughout the same, FIG. 1 is an enlarged view of a fastener which may be used for securing tire carcasses together;

FIG. 2 is a sectional view illustrating various ways to which tire carcasses may be secured together by the fasteners of FIG. 1;

FIG. 3 is an elevational view of a chain of tire carcasses secured together;

FIG. 4 is a plan view illustrating the manner in which a free-standing fence may be constructed;

FIG. 5 is a plan view of an alternative chain of tire carcasses assembled together with their side walls in surface engagement with each other;

FIG. 6 illustrates the manner in which a mat of carcasses may be assembled;

FIGS. 7A and 7B are elevational views, 90° apart, illustrating the manner in which a pyramid of carcasses may be made.

DESCRIPTION OF THE PREFERRED EMBODIMENT

Referring now to the drawings, FIG. 1 illustrates a fastener 10 which may be used to secure tire carcasses together. Fastener 10 comprises a bolt member 11 having an enlarged radial head 12 and a shank 13 extending centrally therefrom. Bolt 11 is preferably formed with integral anchor members 14 which normally project outwardly from the circumference of the shank but which may flex inwardly into adjacent pockets 15 formed in the body of the shank. Fastener 10 also includes a nut member 16 having an enlarged radial flange portion 17 and a central bore 18, the bore being provided with a series of circumferential grooves 19 having shoulders 20 shaped complementary to the tips of the anchor members 14 on the bolt shank. Preferably the bolt 11 and nut 16 are formed, as by injection molding from a plastic material, such as nylon, which is non-corrodable in salt water. If desired, the bolt shank 13 may be provided with a sharpened metal end piece 21 to facilitate penetration of tire carcasses. Also, if desired, the nut 16 may be formed with a relatively blunt end 22 at the end of bore 18 to protect against contact with the sharpened end of the bolt when the fastener parts are secured together.

FIG. 2 illustrates the manner in which tire carcasses may be secured together by fastener 10. For example, tire carcasses 25a and 25b may be arranged so that their crowns 27 are in surface contact with each other. With the carcasses in place the bolt portion 11 of fastener 10 is driven from the inside of carcass 25a through the crowns of both carcasses. The bolt may be so driven by a hammer blow, or a suitable tong tool may be used which fits within carcasses 25a and 25b and which may force the bolt through the joining carcasses. The nut member 16 is then pushed onto the end of shank 13 inside carcass 25b. As the nut is pushed onto the shank, the anchor members 14 flex into the pockets 15, enabling the nut to pass down the shank until the enlarged radial portions 12 and 17 of the bolt and nut engage the inner surfaces of the tire carcasses. The anchor portions 14 will expand outwardly so that the tips thereof engage the nut shoulders 20 to hold the fastener together. The resiliency of the tire carcasses will permit the nut to be driven home sufficiently far that the anchor portion of the shank will latch into the nut shoulders with the carcasses compressed between the bolt and nut flanges to hold the carcasses snugly together. If desired, two fasteners 10 may be used to join the touching crowns of tires 25 and 26 together to increase the strength of the joinder of these carcasses.

As is indicated in FIG. 2, tire carcasses 25a and 25c may be disposed parallel to each other so that the side walls 29 thereof are in contact with each other. Two or more fasteners 10 are then driven through the touching side walls to secure the carcasses together.

Also as is indicated by FIG. 2, tire carcasses 25a and 25d may be disposed so that the side wall 29 of carcass 25a is in surface contact with the crown 27 of carcass 25d. Again, one or more fasteners 10 are used to piece and secure the carcasses together.

FIG. 3 illustrates the manner in which tire carcasses 25 may be built into chains, by being arranged in crown-to-crown surface engagement. Each carcass is joined to the ones on either side thereof by one or more fasteners 10. In arranging the carcasses, if there is a bald spot or if the plies of the carcass have been worn through at a point on the carcass the carcass will be rotated so that such spot or point is located other than adjacent the next carcass. Two fasteners will give more strength to the chain and will help prevent twisting of the carcasses relative to each other about the axis of the fasteners. On the other hand, at times it may be desirable to allow such swiveling action, and the use of a single fastener will enable such action to be achieved. FIG. 3 also illustrates the use of a chain as a fence. In such case a post 35 may be driven into the ground and the end carcass 25e is rotated about fastener 10 so that it is horizontally disposed. The end carcass 25e then fits over the post 35 to anchor the end of the fence. Other carcasses, such as 25f, may also be horizontally disposed and held in place relative to the ground by a post 36 passing through the central opening of the carcass.

Many uses may be devised for such chains of carcasses. One example is that of flood control wherein a chain of carcasses is anchored at both banks of a stream and the chain extends across the stream, resting on the bottom thereof. During flood seasons, the water will impinge upon the fence and churn itself up into foam, thus breaking the force of the water to a great degree. Such chains could thus be used upstream of a bridge to protect the bridge and footings thereof during flood seasons. The resiliency of the carcasses enables them to absorb and resist much of the stream force. Likewise, the carcasses and plastic fasteners will deteriorate very slowly in water and hence the chain will have a long life in such use.

Tire carcass chains can also be used to line embankments alongside of roads to serve a dual purpose of retaining the embankments alongside of roads to serve a dual purpose of retaining the embankment against erosion and as impact absorbers in the event a vehicle should veer off the road into the embankment. The energy absorbing ability of tire carcasses may also be put to advantage to line auto-racing tracks.

FIG. 4 illustrates the way in which a free-standing fence of tire carcasses may be built up. In such case the carcasses 25 are again built into crown-to-crown chain, with the carcasses being vertically disposed relative to the ground. At desired points along the chain, as at carcass 25g, additional carcasses 25h can be joined with their crowns to the side walls of carcass 25g to project out at right angles to carcass 25g. Carcasses 25j can then be joined to carcasses 25h as shown to provide additional rigidity to the carcass posts.

FIG. 5 illustrates in plan view an alternative manner of building up a chain of carcasses. In this instance, the carcasses 25 are staggered so that the side walls of the carcasses are in surface engagement with each other, rather than being in crown-to-crown contact with each other. Such a chain construction will have greater strength since generally the side walls of carcasses are stronger than the worn crowns of the carcasses. In addition, a lengthwise force on the chain will be resisted by the sheer strength as well as the axial pull-out strength of the fasteners.

FIG. 6 illustrates tire carcasses 25 which are built up into a mat made up of a plurality of parallel chains of carcasses in crown-to-crown contact and in which the carcasses of one chain are in crown-to-crown contact with the carcasses of the next chain. Such mats can be used for a variety of purposes. One such use is that of forming a stable base in swampy areas, wherein the mat is disposed flat on the ground to support a road or other structure. In very swampy areas, a first mat can be laid down and then a second mat can be built up on top of the first.

Mats of tire carcasses, such as shown in FIG. 6, can also be used for protection of stream beds against erosion in flood seasons. Such a mat can be built up to cover the side of the stream to be protected. In flood time the carcasses will absorb the energy of the water and objects carried by the water, and will cause the water to churn up, diminishing its force and protecting the bank.

FIGS. 7A and 7B illustrate the way in which three-dimensional structures may be built up from tire carcasses fastened together at their points of surface contact. In this instance, a pyramid is built up, as illustrated. Such pyramids are uniquely adapted for marine use as breakwaters. Again the resiliency of the carcasses enables these structures to resist the pounding of the water and the cutting action of the sand. Tire carcasses and the plastic fasteners will not corrode in sea water and the structure will retain its integrity for a long period of time. The pyramidal shape of the structure provides good base support and even if the structure should be turned over by the water action it would come to rest on another large base area.

Another use for a pyramid structure as shown in FIGS. 7A and 7B would be in combination with a mat as shown in FIG. 6. Thus, a mat could be laid down in a swampy area and a pyramid erected thereon to support a high-tension electrical line. The carcasses are excellent electrical insulators and thus the line could be attached directly to a carcass.

Many other structures can be devised for other purposes. For example, a plurality of vertically disposed carcasses can be built into a four-sided, open-top enclosure, several carcasses on a side and several carcasses high. A sheet of plastic can then be used to line the interior of the enclosure to form a free-standing storage bin for grains or other crops, an additional sheet of plastic being placed over the top as a cover to keep water out of the bin.

Another use of discarded tire carcasses would be for outdoor playground equipment, wherein structures can be built up for children to play upon. The resiliency of the carcasses provides a safe structure, free of sharp objects, and the children can find many crawl spaces through the central openings of the tires.

Many other similar structures and uses can be found which will take advantage of the strength and durability of discarded tire carcasses and thus enable these otherwise highly undesirable objects to be put to beneficial use.

Having thus described my invention, I claim:
1. A structure formed of discarded tire carcasses comprising:
(a) at least one pair of whole tire carcasses, one of said pair of tire carcasses having an exterior surface portion touching an exterior surface portion of the other of said pair of tire carcasses,
(b) a fastener member extending between the interiors of said pair of tire carcasses, said fastener member consisting of an intermediate portion thereof piercing and passing generally perpendicularly through both carcasses at the point where said carcasses touch each other, said fastener member having end portions at both ends of and extending generally laterally from said intermediate portion, said end portions being in holding engagement with the interior surfaces of said tire carcasses.

2. A structure as set forth in claim 1, wherein said fastener member comprises a bolt member having a shank and an enlarged head extending laterally therefrom at one end thereof, said shank having a sharpened end and a plurality of outwardly and rearwardly extending anchor members, said anchor members being flexible inwardly towards said shank, and a nut having a bore of a diameter to enable said shank to pass thereinto when said anchor members are flexed inwardly, said bore having a generally circumferential shoulder engageable by said anchor members when said anchor members are outwardly and rearwardly extending.

3. A structure as set forth in claim 2 wherein said bolt and nut are made of nylon plastic material.

4. A structure as set forth in claim 1 wherein the crown of one of said tire carcasses of said pair is in surface contact with the crown of the other of said tire carcasses of said pair.

5. A structure as set forth in claim 1 wherein the side wall of one of said tire carcasses of said pair is in surface contact with the side wall of the other of said tire carcasses of said pair.

6. A structure as set forth in claim 1 wherein the crown of one of said tire carcasses of said pair is in surface contact with the side wall of the other tire carcass of said pair.

7. A structure as set forth in claim 1 and comprising a plurality of whole tire carcasses formed into a chain of carcasses in crown-to-crown surface contact with each other, and a fastener member as set forth in claim 1 joining each pair of contacting tire carcasses.

8. A structure as set forth in claim 1 and comprising a plurality of whole tire carcasses formed into a plurality of parallel chains, each chain comprising a plurality of carcasses in crown-to-crown surface contact with each other and the carcasses of one chain being in crown-to-crown surface contact with the carcasses of an adjacent chain, and a fastener member as set forth in claim 1 joining each pair of contacting tire carcasses.

9. A structure as set forth in claim 1 and comprising a plurality of whole tire carcasses formed into a plurality of parallel chains, each chain comprising a plurality of carcasses in crown-to-crown surface contact with each other, and the carcasses of one chain being in side wall-to-side wall surface contact with the carcasses of an adjacent chain, and a fastener member as set forth in claim 1 joining each pair of contacting tire carcasses.

10. A structure as set forth in claim 9 and further including a plurality of whole tire carcasses formed into a second layer of parallel chains as set forth in claim 1, the carcasses of said second layer being in crown-to-crown contact with the carcasses of said first layer, and a fastener member as set forth in claim 1 joining each pair of contacting tire carcasses.

References Cited

UNITED STATES PATENTS

| | | | |
|---|---|---|---|
| 2,032,511 | 3/1936 | Stevenson | 293—71 P X |
| 3,661,359 | 5/1972 | Walker | 293—71 P X |
| 3,664,653 | 5/1972 | Walker | 293—1 X |
| 3,627,362 | 12/1971 | Brenneman | 85—7 X |
| 2,863,197 | 12/1958 | Statham | 85—DIG. 2 |

FOREIGN PATENTS

| | | | |
|---|---|---|---|
| 982,259 | 3/1965 | Great Britain | 85—7 |
| 341,761 | 11/1959 | Switzerland | 85—7 |

PHILIP DIER, Primary Examiner

U.S. Cl. X.R.

85—7; 161—48; 238—14; 293—1, 71

UNITED STATES PATENT OFFICE
CERTIFICATE OF CORRECTION

Patent No. 3,764,446　　　　　　　　Dated October 9, 1973

Inventor(s) Macklin F. Martin

It is certified that error appears in the above-identified patent and that said Letters Patent are hereby corrected as shown below:

The title on the sheet of drawings and at the top of the first page is corrected to read:

MEANS OF UTILIZING
DISCARDED TIRE CARCASSES

Signed and sealed this 9th day of April 1974.

(SEAL)
Attest:

EDWARD M. FLETCHER, JR.　　　　　　C. MARSHALL DANN
Attesting Officer　　　　　　　　　Commissioner of Patents